United States Patent
Ibrahim et al.

(10) Patent No.: US 6,612,835 B2
(45) Date of Patent: Sep. 2, 2003

(54) HIGH-TEMPERATURE, NON-CATALYTIC, INFRARED HEATER

(75) Inventors: Mounir Ibrahim, Bay Village, OH (US); Thomas D. Briselden, Lakewood, OH (US)

(73) Assignee: Cleveland State University, Cleveland, OH (US)

( * ) Notice: Subject to any disclaimer, the term of this patent is extended or adjusted under 35 U.S.C. 154(b) by 0 days.

(21) Appl. No.: 10/057,377

(22) Filed: Jan. 24, 2002

(65) Prior Publication Data

US 2002/0146658 A1 Oct. 10, 2002

Related U.S. Application Data

(62) Division of application No. 09/728,596, filed on Dec. 1, 2000, now Pat. No. 6,368,102.

(51) Int. Cl.[7] .................................................. F27B 7/06
(52) U.S. Cl. ...................... 432/31; 432/175; 432/254.1; 392/408; 126/92 AC
(58) Field of Search ............................. 432/20, 31, 32, 432/102, 174, 175, 213, 251, 254.1; 264/521, 522; 392/407, 408, 416, 432, 435; 126/91 R, 92 R, 92 C, 92 AC, 85 R

(56) References Cited

U.S. PATENT DOCUMENTS

| | | | | |
|---|---|---|---|---|
| 3,515,865 A | * | 6/1970 | Kreis | 362/266 |
| 3,545,425 A | * | 12/1970 | Dikin | 126/92 R |
| 4,307,284 A | * | 12/1981 | Perron | 392/355 |
| 4,741,323 A | * | 5/1988 | Pivonka | 126/85 R |
| 4,976,609 A | * | 12/1990 | Grob et al. | 126/373.1 |
| 5,058,196 A | * | 10/1991 | Nakamura et al. | 392/435 |
| 5,628,303 A | * | 5/1997 | Ahmady et al. | 126/91 A |
| 6,190,162 B1 | * | 2/2001 | Smith et al. | 431/328 |

* cited by examiner

*Primary Examiner*—Gregory Wilson
(74) *Attorney, Agent, or Firm*—Pauley Petersen Kinne & Erickson

(57) ABSTRACT

A high-temperature, non-catalytic, infrared heater is formed within a housing having a bottom and at least one side lined with a refractory material. The burner includes a burner surface area and is positioned within the housing. A re-radiating surface is positioned above the burner and comprises a mesh having a re-radiating surface area greater than the burner surface area with the re-radiating surface operating between approximately 400° F. and 2200° F.

18 Claims, 3 Drawing Sheets

HIGH-TEMPERATURE, NON-CATALYTIC, INFRARED HEATER

This is a division of application Ser. No. 09/728,596 filed Dec. 1, 2000 now U.S. Pat. No. 6,368,102.

BACKGROUND OF THE INVENTION

1. Field of the Invention

This invention relates to a high-temperature, non-catalytic, infrared heater having a burner and a re-radiating surface proportioned to operate the heater at approximately 600° F. to 1400° F.

2. Description of the Prior Art

Thermoforming is a process which uses heat and pressure and/or vacuum to form parts from an extruded sheet of thermoplastic. In the process of thermoforming, plastic is drawn from large rolls, heated to its softening temperature, and then formed into a desired shape using an aluminum forming tool. The plastic is then cut into individual containers, stacked, inspected, counted, boxed and shipped. The heating section uses infrared heaters to soften the plastic sheet to forming temperature.

The thermoforming industry currently consists of over 500 manufacturers representing 6,300 manufacturing lines. Of these, 95% utilize electric infrared heaters while the remainder are gas fired.

Thermoforming machine manufacturers and end-users have identified that the electric energy cost to heat the plastic sheet accounts for 35% to 50% of the cost of the end product. The ability to use natural gas as the primary source of heating energy could reduce this number to less than 10% due to the 3:1 cost advantage of natural gas. The primary reason for not using gas-fired infrared is due to operating temperature and control limitations of available gas heaters. The optimum operating temperature of a heater used in the thermoforming process is 600° F. to 1200° F. Gas catalytic heaters operate between 400° F. to 950° F. or gas ceramic heaters operate between 1400° F. to 2000° F. Therefore, a gas fired infrared heater that operates between 600° F. to 1200° F. would offer the thermoforming industry a cost-effective product to reduce operating cost while maintaining part quality.

Three types of heaters are currently in use in the thermoforming industry including: (1) electric heaters that operate between 600° and 1200° F., have a power density of 30 watt/in$^2$ and an overall efficiency>40%; (2) gas catalytic heaters that operate<950° F., have power density=10 watt/in$^2$ and an overall efficiency<30%; and (3) gas ceramic heaters that operate>1400° F., have a power density>50 watt/in$^2$ and an overall efficiency<30%.

Power density is defined as the total energy input into the heater divided by the surface area. This number is often confused with and is always higher than the actual radiant heat flux delivered to the plastic (i.e. 30 watt/in$^2$ radiant heat flux vs. 50 watt/in$^2$ power density). The overall efficiency is defined as the energy absorbed by the plastic sheet divided by the total energy input into the heater. It is therefore necessary and a desired object of this invention to improve the efficiency of gas based heaters.

SUMMARY OF THE INVENTION

It is one object of this invention to provide an optimum heater for a radiant heat flux of 5 to 30 watt/in$^2$ with a heater surface temperature between 400° F. and 2200° and more preferably 600° F. and 1400° F. to promote efficient and uniform vertical heating of a plastic sheet.

It is another object of this invention to provide a heater that increases the overall efficiency of the heating process to greater than 40% by minimizing exhaust temperature and/or recovering waste heat of the IR heater.

It is another object of this invention to provide a heater that minimizes the power density of the heater to less than 50 watt/in$^2$ by increasing the conversion of fuel energy to radiant energy.

It is a further object of this invention to provide a heater having a surface area of approximate dimensions that allow for easy retrofit to existing machines.

It is yet another object of this invention to provide a heater that promotes temperature uniformity of the heat to better than ±10° F. to maintain consistent horizontal heating.

A heater according to a preferred embodiment of this invention comprises a housing preferably including a bottom and at least one and preferably four sides and lined with a refractory material. A burner is preferably positioned within the housing which operates in a preferred range of between approximately 1400° F. and 2200° F.

A re-radiating surface have a re-radiating surface area is preferably positioned above the burner. The re-radiating surface may comprise a mesh of a variable mesh size and/or a variable mesh configuration across the re-radiating surface area. The re-radiating surface area according to one experiment may be greater than the burner surface area by approximately five times.

To improve the overall efficiency of the gas based heaters it is necessary to match the wavelengths of the heater surface to that of the plastic. In a preferred embodiment of this invention, the heater is operated at a surface temperature of approximately 1200° F. According to this invention, another effective manner of improving the overall efficiency of gas-based heaters is to improve the conversion of gas-based energy to radiant energy. This is accomplished by minimizing heater exhaust temperatures with enhanced heat transfer or heat recovery devices. Both of these methods will increase the overall efficiency of the heater and reduce the power density of the heater. The radiant heat flux will remain the same assuming the heater surface temperature is maintained at 1200° F.

The variable area design uses a burner source of smaller surface area (Ah) than a re-radiating surface (Ar) to convert combustion energy into usable radiant power. The heater is an infrared heater that operates at surface temperatures greater than 1400° F. and is of a premix design. Its surface may be shaped from concave to flat to convex and may be of any geometric shape, including square, circle, etc. The burner radiates heat from its surface to the surface area of the re-radiating surface. In addition, high temperature exhaust gases emanate from the surface of the burner and flow to the re-radiating surface. The re-radiating surface is heated by radiation from the burner and by convection from the recirculating gases in the box. This energy, in turn, is transferred by conduction within the re-radiating surface to the re-radiating surface's surface which in turn radiates heat to the plastic sheet.

According to a preferred embodiment of this invention, the burner surface area (Ah) is smaller than the re-radiating surface area (Ar). This design diffuses the energy to the re-radiating surface and allows the surface to operate at a temperature less than 1400° F. In addition, the burner is preferably enclosed in a refractory lined box that receives heat from the radiator and reflects this heat to the re-radiating surface. By efficiently convecting the exhaust energy to radiant energy, the exhaust temperature exiting the surface of the re-radiating surface is near a theoretical minimum. The exhaust temperature is slightly higher than the re-radiating surface temperature.

The areas are preferably designed such that when the burner is at 1400° F., the re-radiating surface is at 600° F., and when the burner is at 2200° F., the re-radiating surface is at 1400° F. The re-radiating nature of the re-radiating surface will provide heat back to the burner and allow it to operate at lower inputs than without the re-radiating surface. This heat re-radiating back to the burner keeps the burner's surface at a higher temperature and allows combustion to occur at the auto-ignition temperature of 1400° F. while at lower power inputs to the heater.

The re-radiating surface will have a mesh of varying size and a mesh of variable design at different locations on the re-radiating surface. It may also be designed with perforated plates or rods of metallic, refractory, or ceramic material.

BRIEF DESCRIPTION OF THE DRAWINGS

The above-mentioned and other features and objects of this invention will be better understood from the following detailed description taken in conjunction with the drawings wherein.

DESCRIPTION OF THE PREFERRED EMBODIMENTS

Figure 1:
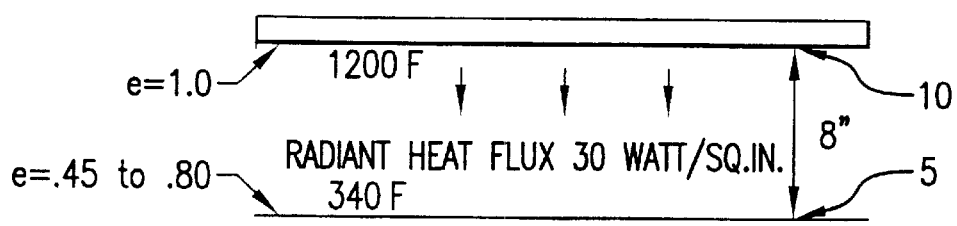
FIG. 1 is a schematic of the thermoforming heating process.

FIG. 1 shows an ideal process for heating a sheet of thermoforming material, such as plastic sheet 5. Thermoforming materials such as PVC exhibit high absorptance at wavelengths between 6 to 10 $\mu$m at typical thermoforming temperatures between 340° F. and 1200° F. Radiant heat transfer calculations indicate that the optimum heat transfer occurs with a heater surface temperature of approximately 1200° F. In addition, a radiant heat flux less than 25 watt/in$^2$ allows plastic sheet 5 to heat uniformly in both the horizontal and vertical planes. This is primarily due to radiant energy of long wavelengths transmitting into plastic sheet in combination with surface heating.

Although in one preferred embodiment of this invention, heater 10 is used in connection with thermoforming, heater 10 may also be used in connection with food processing, metal finishing, paper drying ovens, powder coating curing ovens and other temperature sensitive industrial applications. Heater 10 may also be used in connection with residential and commercial appliances, space heating and comfort heating applications.

In general plastic materials have low thermal conductivity (<0.05 watt/m-C°). In the case of heavy gauge material, this reduces the overall heat transfer coefficient and limits the absorptance of energy by means of convection to less than 10% of the total energy absorbed by the plastic material.

Figure 2:
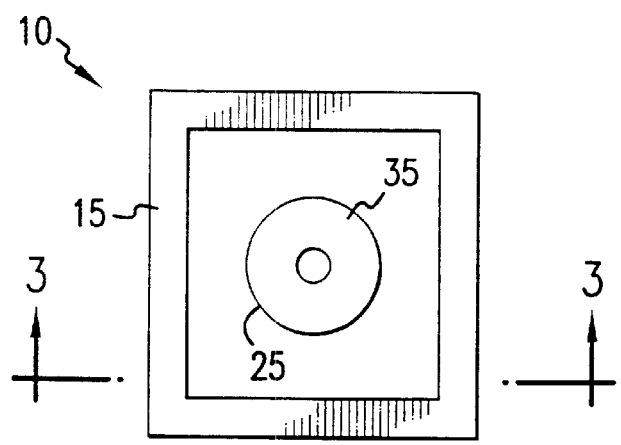
FIG. 2 is a schematic top view of a burner according to one preferred embodiment of this invention.
Figure 3:
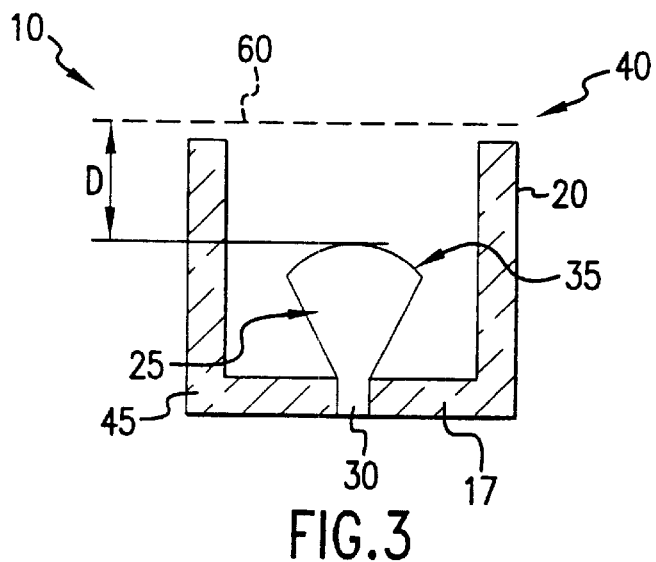
FIG. 3 is a schematic cross-sectional side view of the burner shown in FIG. 2.

FIGS. 2 and 3 show a high-temperature, non-catalytic, infrared heater 10. Housing 15 preferably provides structure for heater 10 and includes bottom 17 and at least one side 20. As shown in FIGS. 1 and 2, housing includes four sides 20. Alternatively, housing 15 may include a single, round side 20 or a multi-side arrangement known to those having ordinary skill in the art. According to one preferred embodiment of this invention, housing 15 is lined with a refractory material.

Burner 25 is preferably positioned in bottom 17 of housing 15. Burner 25 is preferably a natural gas burner having a supply 30 of natural gas or natural gas/air premix. Burner 25 may be of a convex, concave, flat or other appropriate configuration have burner surface area 35.

According to one preferred embodiment of this invention, burner 25 operates between approximately 1400° F. and 2200° F.

Re-radiating surface 40 have re-radiating surface area 42 is preferably positioned above burner 25. According to one preferred embodiment of this invention, re-radiating surface 40 comprises mesh 50 constructed from stainless steel or other suitable material. Mesh 50 may have a variable mesh size across re-radiating surface area 42 and/or a variable mesh configuration across re-radiating surface area 42.

Figure 6:
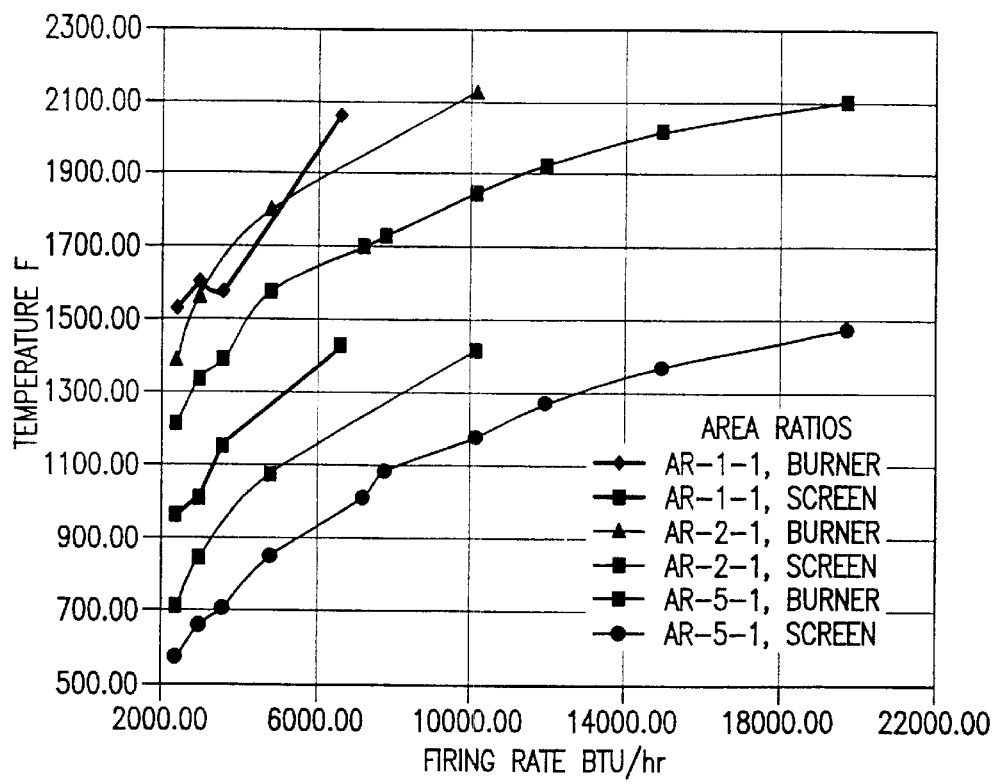
FIG. 6 is a graph showing burner and re-radiating surface temperatures vs. firing rate for area ratios of 1:1, 2:1 and 5:1.

Re-radiating surface area 42 is greater than burner surface area 35. As shown in FIG. 6, heater 10 operates within a preferred temperature range when re-radiating surface area 42 is approximately five times larger than burner surface area 35. According to a preferred embodiment of this invention and in applications suitable for the thermoforming process, re-radiating surface 40 operates between approximately 400° F. and 2200° F. and more preferably between approximately 600° F. and 1400° F.

According to alternative embodiments of this invention, re-radiating surface 42 comprises perforated plate 60 or a perforated rod. Perforations may comprise an irregular pattern and or irregular perforation size similar to mesh 50.

Figure 4:
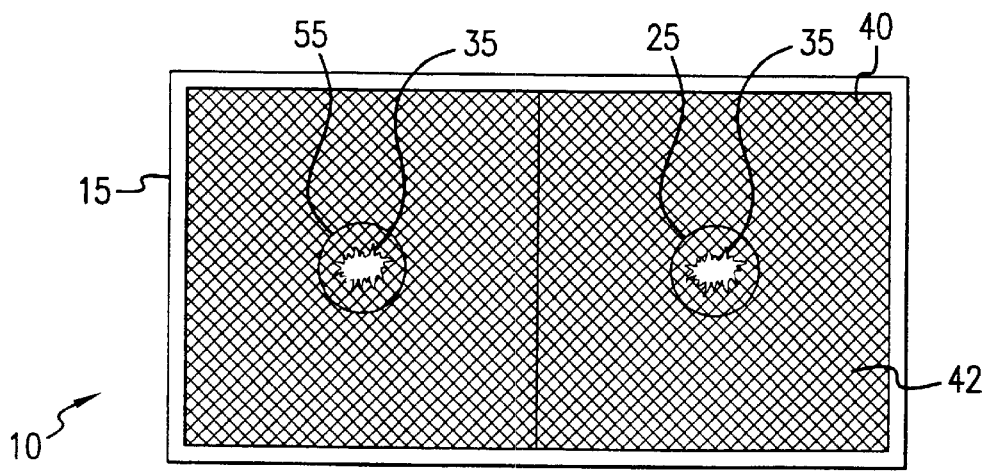
FIG. 4 is a schematic top view of a burner according to one preferred embodiment of this invention.
Figure 5:
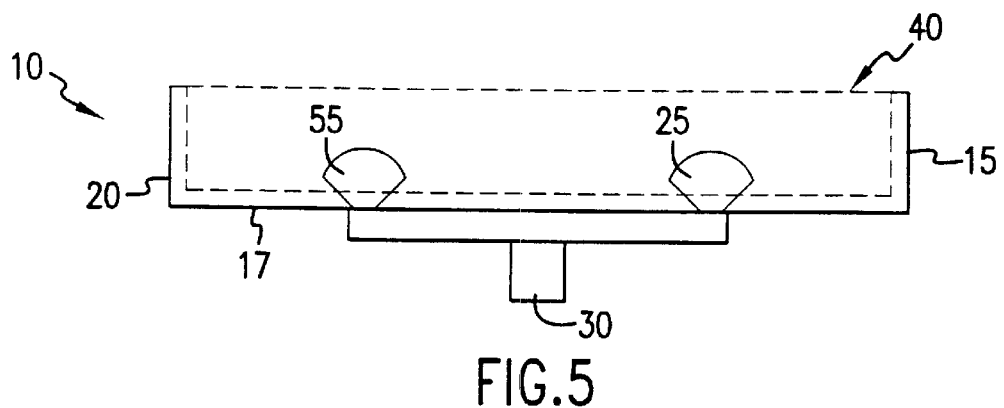
FIG. 5 is a schematic cross-sectional side view of the burner shown in FIG. 4.

As shown in FIGS. 4 and 5, heater 10 may further include second burner 55 positioned within housing 15. Additional burners may be positioned within housing 15 depending upon output and size requirements of heater 10.

The high-temperature, non-catalytic, infrared heater 10 according to a preferred embodiment of this invention preferably operates at a firing rate range of approximately 2,000 to 20,000 BTU/hr.

Re-radiating surface 40 is preferably designed to maximize the transfer of heat by convection and conduction within re-radiating surface 40 and in turn, conversion to radiant power. This is accomplished by identifying a re-radiating surface material with high thermal conductivity, high emissivity, and high surface area. Housing 15 is dimensioned to fit with existing equipment, for example minimum dimensions equal to 6" wide by 6" long with a depth no greater than 4" measured from the bottom of the heater inlet to the top of re-radiating surface 40.

EXPERIMENTAL DATA

Figure 7:
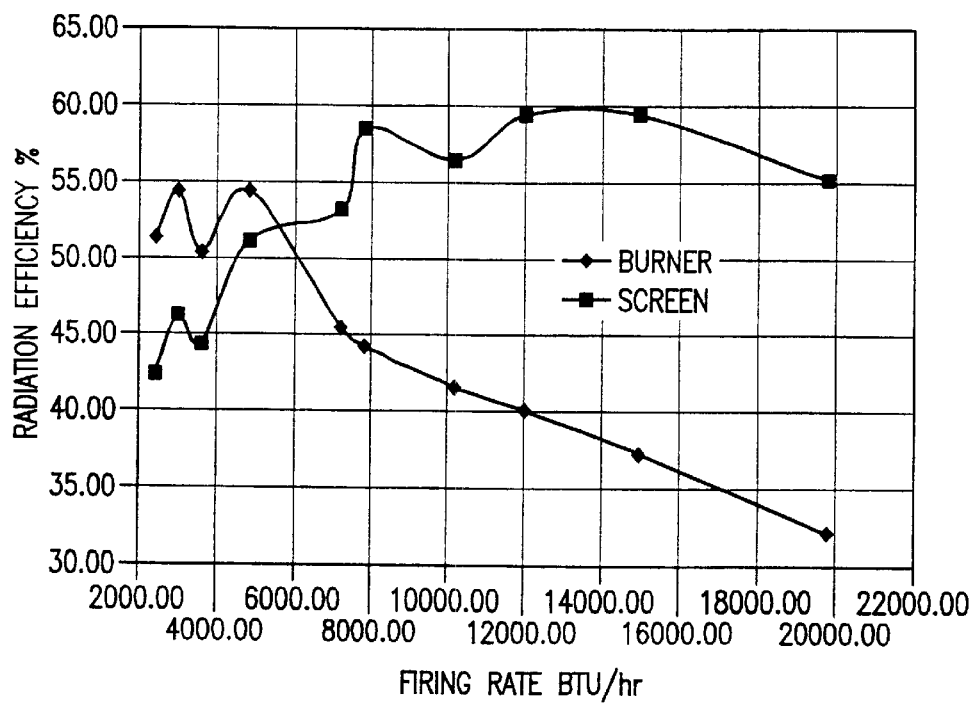
FIG. 7 is a graph showing radiation efficiency for burner and re-radiating surface at different firing rates for an area ratio of 5:1.

FIGS. 6 and 7 show a sample of the experimental data obtained. In FIG. 6, the burner and re-radiating surfaces temperatures (F) are plotted versus the firing rate (BTU/hr) for the area ratios (re-radiating surface area:burner surface area) of 1:1, 2:1 and 5:1. It can be seen that the area ratio of 5:1 will provide a re-radiating surface temperature in the range of 600° to 1400° F. and in the firing rate range of 2000 to 20,000 BTU/hr. According to the experimental data, this capability is not achievable by other area ratios 1:1 & 2:1. FIG. 7 shows the radiation efficiency for area ratio 5:1 and the same range of firing rate (as in FIG. 6) for both the burner and the re-radiating surface. Over a wide range of firing rates the re-radiating surface has a higher radiation efficiency compared to the burner. This increase in radiation efficiency resulted from: (1) conversion of some convection losses into radiation; (2) reduction in overall losses via a burner design having an area ratio of 5:1. Although a 5:1 ratio was used in and tested in the experimental apparatus, other ratios are possible and feasible according to preferred embodiments of this invention.

While in the foregoing specification this invention has been described in relation to certain preferred embodiments thereof, and many details have been set forth for purposes of illustration, it will be apparent to those skilled in the art that the apparatus is susceptible to additional embodiments and that certain of the details described herein can be varied considerably without departing from the basic principles of the invention.

We claim:

1. A high-temperature, non-catalytic, infrared heater comprising:

a housing having a bottom and at least one side;

a burner positioned in the bottom of the housing, the burner having a natural gas supply and a burner surface area, the burner operating between approximately 1400° F. and 2200° F.;

a re-radiating surface positioned above the burner, the re-radiating surface having a re-radiating surface area greater than the burner surface area, the re-radiating surface operating between approximately 400° F. and 2200° F.

2. The high-temperature, non-catalytic, infrared heater of claim 1 wherein the housing is lined with a refractory material.

3. The high-temperature, non-catalytic, infrared heater of claim 1 wherein the re-radiating surface comprises a mesh.

4. The high-temperature, non-catalytic, infrared heater of claim 3 wherein the mesh comprises a variable mesh size across the re-radiating surface area.

5. The high-temperature, non-catalytic, infrared heater of claim 3 wherein the mesh comprises a variable mesh configuration across the re-radiating surface area.

6. The high-temperature, non-catalytic, infrared heater of claim 1 wherein the re-radiating surface comprises a perforated plate.

7. The high-temperature, non-catalytic, infrared heater of claim 1 further comprising a second burner positioned in the bottom of the housing.

8. The high-temperature, non-catalytic, infrared heater of claim 1 wherein the re-radiating surface area is approximately five times larger than the burner surface area.

9. The high-temperature, non-catalytic, infrared heater of claim 1 wherein the re-radiating surface area is approximately five times greater than a burner surface area.

10. A high-temperature, non-catalytic, infrared heater comprising:

a housing having a bottom and at least one side lined with a refractory material;

a burner positioned in the bottom of the housing, the burner having a burner surface area;

a re-radiating surface positioned above the burner, the re-radiating surface comprising a mesh of an irregular pattern having a re-radiating surface area greater than the burner surface area, the re-radiating surface operating between 400° F. and 2200° F.

11. The high-temperature, non-catalytic, infrared heater of claim 10 wherein the mesh comprises a variable mesh size across the re-radiating surface area.

12. The high-temperature, non-catalytic, infrared heater of claim 10 wherein the mesh comprises a variable mesh configuration across the re-radiating surface area.

13. The high-temperature, non-catalytic, infrared heater of claim 10 further comprising a second burner positioned in the bottom of the housing.

14. A high-temperature, non-catalytic, infrared heater comprising:

a housing lined with a refractory material;

a burner positioned within the housing, the burner having a burner surface area;

a re-radiating surface positioned above the burner, the re-radiating surface comprising a mesh of an irregular pattern and having a re-radiating surface area approximately five times greater than the burner surface area, the re-radiating surface operating between 600° F. and 1400° F.

15. The high-temperature, non-catalytic, infrared heater of claim 14 further comprising a second burner positioned within the housing.

16. The high-temperature, non-catalytic, infrared heater of claim 14 wherein the burner operates between 1400° F. and 2200° F.

17. The high-temperature, non-catalytic, infrared heater of claim 14 having a firing rate range of approximately 2,000 to 20,000 BTU/hr.

18. The high-temperature, non-catalytic, infrared heater of claim 14 wherein the burner is convex.

* * * * *